United States Patent [19]

Hosaka et al.

[11] Patent Number: 4,920,424
[45] Date of Patent: Apr. 24, 1990

[54] METHOD OF RECORDING AND REPRODUCING MULTI-CHANNEL INFORMATION ON AND FROM RECORDING MEDIUM

[75] Inventors: Sumio Hosaka; Toshiyuki Amaya; Toshiji Daito; Hiroshi Itoh; Takumi Jinguji, all of Tokorozawa, Japan

[73] Assignee: Pioneer Electronic Corporation, Tokyo, Japan

[21] Appl. No.: 199,179

[22] Filed: May 26, 1988

[30] Foreign Application Priority Data

Aug. 6, 1987 [JP] Japan .................. 62-196875

[51] Int. Cl.$^5$ .................. G11B 7/00; H04N 5/76
[52] U.S. Cl. .................. 358/343; 360/19.1; 360/9.1; 358/138
[58] Field of Search .................. 358/138, 341, 342, 343, 358/330, 133, 136; 360/19.1, 33.1, 39, 8, 9.1

[56] References Cited

U.S. PATENT DOCUMENTS 4,752,832  6/1988  Higurashi .................. 358/341 X
4,794,465 12/1988  Van Luyt .................. 358/341
4,800,446  1/1989  Kanamaru .................. 358/343

*Primary Examiner*—Robert L. Richardson
*Attorney, Agent, or Firm*—Fleit, Jacobson, Cohn, Price, Holman & Stern

[57] ABSTRACT

A method of recording N-channel video signals and M-channel audio signals (N, M being natural numbers) includes the steps of periodically extracting the video signal for one unit period, thereby thinning out the video signal, for each of the N-channel video signals, in turn combining the extracted video signals by a time division multiplexing operation. The method also includes the step of coding each of the M-channel audio signals to form M code trains, compressing in time each of the M code trains by a factor of 1/M or less and dividing each of the M code trains into a plurality of blocks, successively combining each block from the M code trains by a time division multiplexing operation. The video and audio signal obtained by the above multiplex operations are recorded on a single recording medium.

6 Claims, 5 Drawing Sheets

METHOD OF RECORDING AND REPRODUCING MULTI-CHANNEL INFORMATION ON AND FROM RECORDING MEDIUM

BACKGROUND OF THE INVENTION

1. Field of the Invention

The present invention relates to a method of recording and reproducing information such as video information and audio information of a plurality of channels on and from a recording medium such as a video disk.

2. Description of Background Information

With conventional video disks, the maximum recording time per side is at most about one hour. In order to extend this maximum recording time, it is conceivable to apply a compression process, for the temporal compression or the compression of band-width, to a video signal and an audio signal, and to record those signals subsequently. Otherwise, it is also conceivable to raise the recording density of the recording medium without applying the compression process to the video and audio signals.

However, in the case of the former method, circuits having a complicated construction ar required for the compression process of the video signal. Especially, it is unfeasible, in the sense of the cost, to apply the compression of a video signal of the NTSC system without degrading the quality of picture. With respect to the latter method, it is the actual circumstance that the technical level at present is not high enough to put that technique to practical use. Thus, it has been difficult to record and reproduce multi-channel video and audio signals on and from a single recording medium without shortening the recording time.

OBJECT AND SUMMARY OF THE INVENTION

In view of the foregoing, an object of the present invention is to provide a recording and reproducing method by which multi channel video and audio signals can be easily recorded and reproduced on and from a single recording medium without shortening the recording time.

A recording and reproducing method according to the present invention comprises the steps of periodically extracting or time sampling a video signal for alternate frames of one unit period, to remove successive frames of the video signal, for each of a plurality of video signals in N-channels (N being a natural number), and combining the extracted video signals by a time division multiplexing operation. Each of the audio signals are M-channels modulated by digitizing (M being a natural number) to form M series of data blocks of digital data a plurality of audio signals in, compressing in time each of the series data blocks by a factor of 1/M or less. The blocks are successively combined each by a time division multiplexing operation, and recorded together with the video signals on a recording medium.

BRIEF DESCRIPTION OF THE DRAWINGS

FIGS. 3A through 3D are diagrams showing a video signal which is recorded and reproduced by the systems of FIGS. 1 and 2 respectively;

FIGS. 4A through 4F are diagrams showing an audio signal which is recorded and reproduced by the systems of FIGS. 1 and 2.

DETAILED DESCRIPTION OF A PREFERRED EMBODIMENT

An embodiment of the method according to the present invention will be explained with reference to the accompanying drawings.

Figure 1:
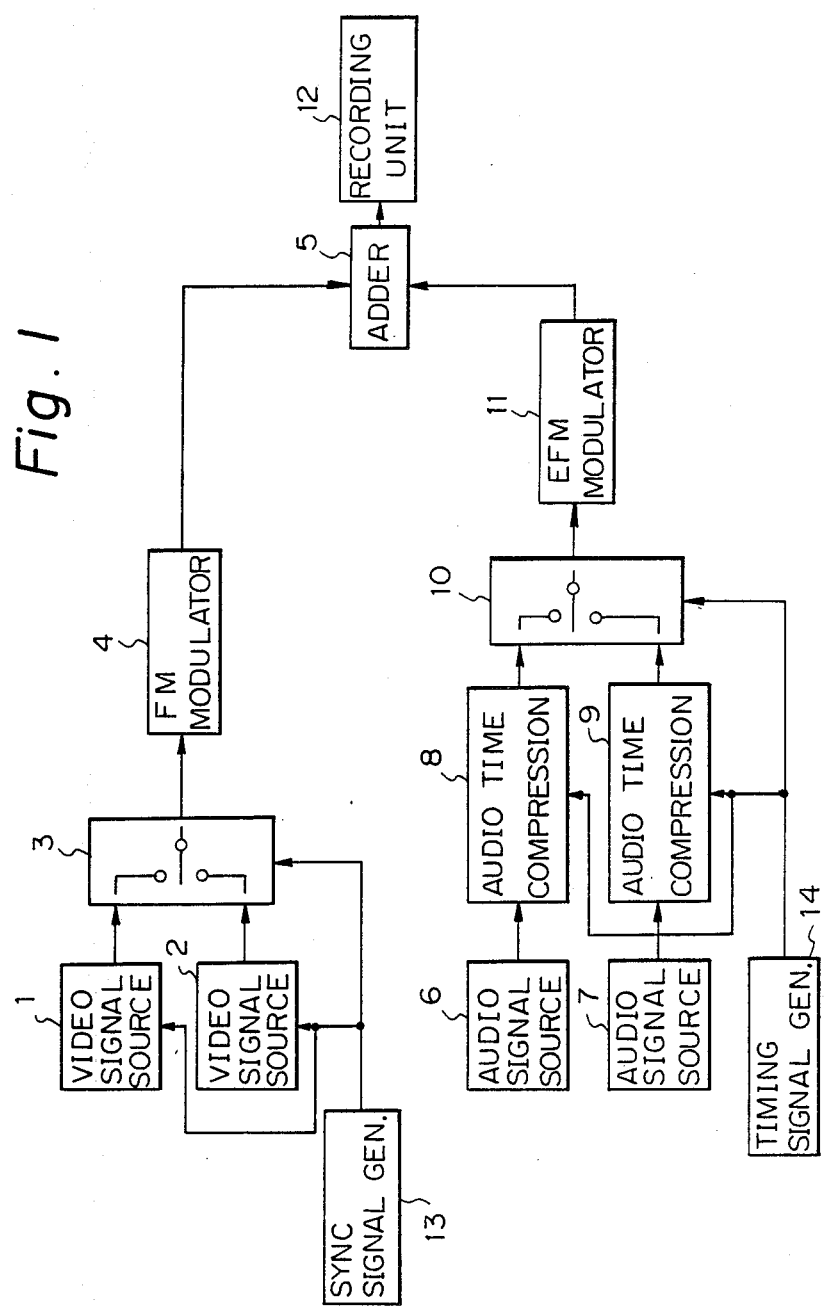
FIG. 1 is a block diagram of a system for recording information in accordance with a method according to the present invention.

In FIG. 1, two channels (channel A and channel B) of video signals are outputted from video signal sources 1 and 2, such as video tape recorders. The video signal sources 1 and 2 are constructed to produce video signals $V_A$ and $V_B$ of channels A and B shown in FIGS. 3A and 3B respectively, in synchronism with a synchronizing signal outputted from a synchronizing signal generator 13, for example.

In FIG. 3A through 3D, reference numerals $A_1$ through $A_6$ denote video signal sections of the channel A for each one frame period in successive 6 frame periods. Similarly, reference numerals $B_1$ through $B_6$ denote video signal sections of the channel B for each one frame period in successive 6 frame periods.

The video signals of channels A and B outputted from the video signal sources 1 and 2 are supplied to a video multiplication circuit 3. The video multiplication circuit 3 is constructed, for example, to generate a itch command signal at every other frame in response to a synchronizing signal generated by the synchronizing signal generator 13, and to selectively output one of the video signals of the channels A and B in accordance with the switch command signal. Therefore, output signal of this video multiplication circuit 3 is such a signal as shown in FIG. 3C in which the video signals of the channels A and B are extracted or time sampled for every other frame thereby removing successive frames of the respective video signals, so that the combination of the signals results in alternating odd frames of channel A and even frames of channel B as shown in FIG. 3C. In addition, a frame code indicating the frame number is preferably appended to the thus formed video signal as is usual for a video signal for video disks.

The output signal of this video multiplication circuit 3 is supplied to an FM modulator circuit 4. In the FM modulator circuit 4, a carrier signal having a predetermined frequency is modulated in frequency, so that a video FM signal is generated. This video FM signal is supplied to an adder circuit 5.

Figures 4A, 4B, 4C, 4D, 4E, 4F:
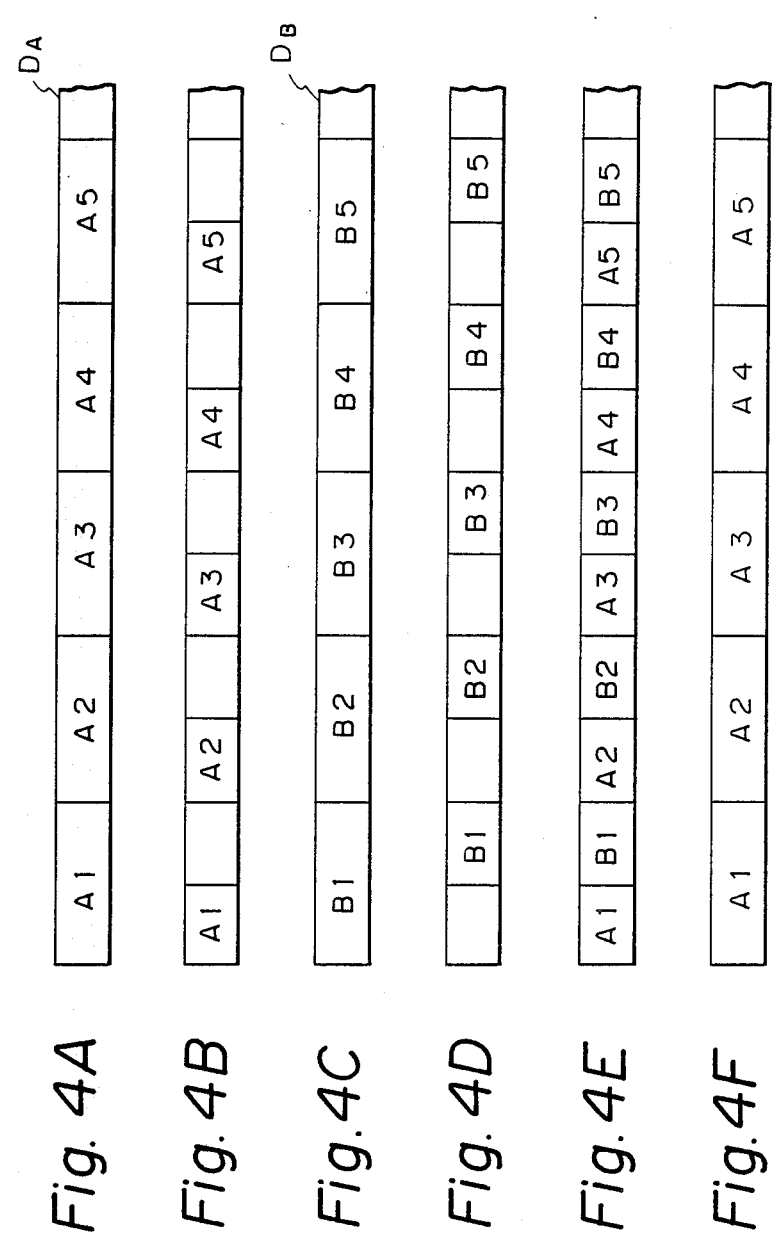

On the other hand, audio signals of the channels A and B are outputted from audio signal source's 6 and 7 such as audio tape recorders. The audio signals of the channels A and B outputted from the audio signal sources 6 and 7 are supplied to audio time compression circuits 8 and 9. The audio time compression circuits 8 and 9 are constructed to perform operations of, for example, generating digital data corresponding to sampled values obtained by sampling the audio signals at a predetermined sampling frequency (44.1 kHz for example), dividing the digital data by a reference timing signal outputted from a timing signal generator 14 thereby forming a series of data blocks, and effecting a time compression operation for each data block by processing the digital data at a speed twice as high as the speed corresponding to the sampling frequency. In other words, the audio time compression circuit 8 is constructed to digitize the audio signal of channel A, to divide the digitized data into a series of data blocks subsequently, thereby forming audio data blocks $D_A$ such as shown in FIG. 4A, and to effect the time compression of series of audio data blocks $D_A$ so that the duration of each block is one-half that prior to compression, thereby outputting data such as shown in FIG. 4B. Similarly, the audio time compression circuit 9 is constructed to digitize the audio signal of channel B, to divide the digitized data into blocks subsequently, thereby forming audio data blocks $D_B$ such as shown in FIG. 4B, and to effect the time compression of the audio data blocks $D_B$ for each block, thereby outputting data such as shown in FIG. 4D.

Output data of these audio time compression circuits 8 and 9 are supplied to an audio multiplication circuit 10. The audio multiplication circuit 10 is, for example, constructed to output alternate blocks of the block data from the audio time compression circuits 8 and 9 as illustrated in FIG. 4E, by a reference timing signal outputted from the timing signal generator 14. Output signal of this audio multiplication circuit 10 is supplied to an EFM modulator 11 in which it is converted to an EFM (Eight to Fourteen Modulation) signal. Output signal of the EFM modulator 11 is supplied to an adder 5, to be added to the output signal of the FM modulator 4. Output signal of this adder 5 is supplied to a recording unit 12. The recording unit 12 is, for example, an optical video disc recorder of a known type, in which the output signal of the adder 5 is supplied to an optical modulator, and a recording track constituted by bits is formed on a recording surface of a master disk driven to rotate at a speed corresponding to the frame frequency (one revolution per one frame period (1/30 second)). Similar to the video signal, the audio signal may include a block code inserted into each block by the audio compression circuits 8 and 9 or by the EFM modulator 10. This code is used for identifying the audio signal source 6 or 7.

Figure 2:
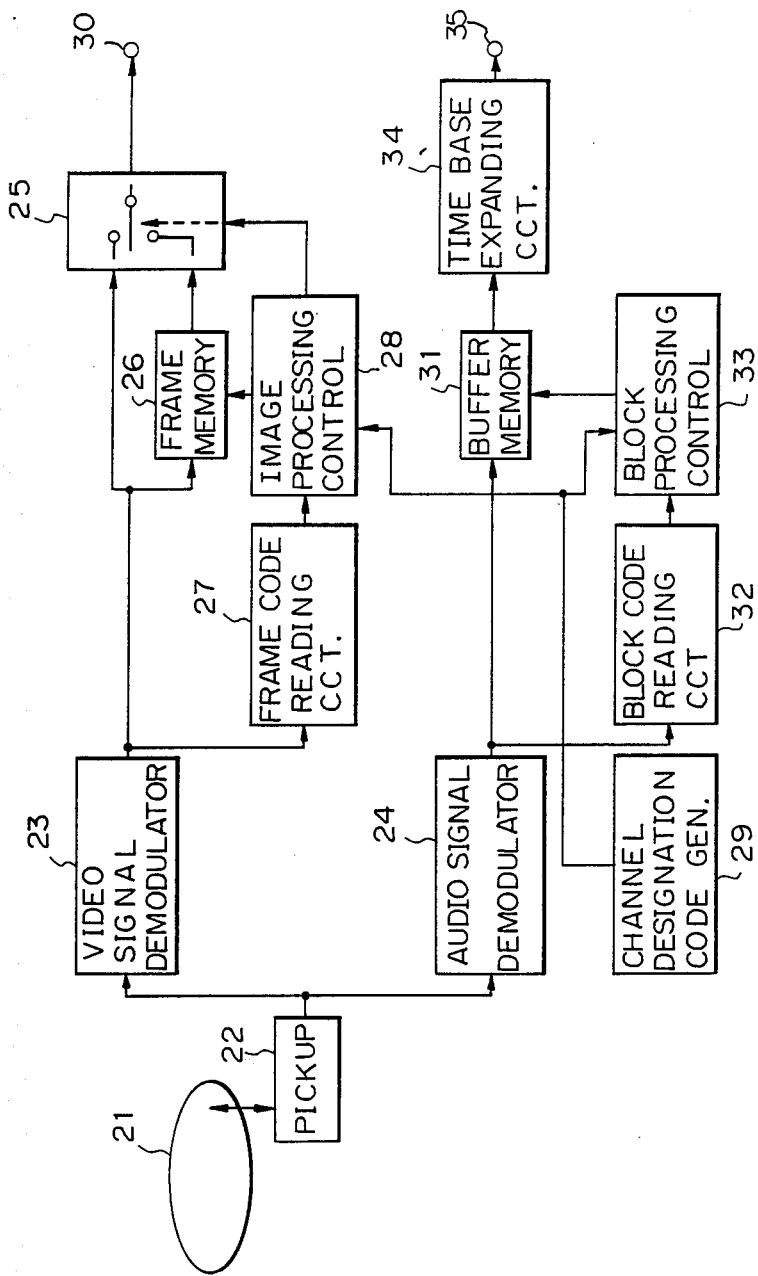
FIG. 2 is a block diagram of a system for reproducing information recorded by the system shown in FIG. 1.

An apparatus for reproducing the video and audio signals from the master disk produced by the above process or a duplicate disk produced by using the master disk is illustrated in FIG. 2.

In FIG. 2, a disk 21 is driven to rotate by means of a motor and its servo system (both not shown) at a speed corresponding to the frame frequency. The information recorded on this disk 21 is read by means of a pickup 22. The pickup 22 includes such elements as a laser diode, an actuator for focusing a light beam emitted from the laser diode on the recording surface of the disk 21, and an actuator for controlling the position of focus point of the light beam in a radial direction of the disk. Servo systems are also provided for driving and controlling the various actuators of the pickup 22. However, the explanation of those servo systems is omitted since it is not essential for the understanding of the present invention.

A read signal of the pickup 22 is supplied to a video signal demodulator 28 and an audio signal demodulator 24. The video signal demodulator 23, for example, includes a band-pass filter for extracting a video FM signal component from the read signal of the pickup 22, and an FM demodulator for a demodulation process of an output signal of the band-pass filter. On the other hand, the audio data demodulator 24, for example, includes a low-pass filter for extracting an audio EFM signal component from the read signal of the pickup 22, and an EFM demodulator for a demodulation process of an output signal of the low-pass filter.

The video signal is demodulated by the video signal demodulator 28, and supplied to one of input terminals of a signal change over switch 25, and also to a frame memory 26 and a frame code reading circuit 27. The frame code reading circuit 27 is constructed to read a frame code inserted, for example, in the back porch of the horizontal synchronizing signal in the video signal, and hold it until the next frame code is read. The frame code outputted from this frame code reading circuit 27 is supplied to an image processing control circuit 28. A channel designation code outputted from a channel designation code generation circuit 29 is supplied to the image processing control circuit 28. The channel designation code generation circuit 2 is for example constructed to generate a code representing a channel designated by a key operation in an operation part (not shown). The image processing control circuit 28 is constructed to discriminate a frame in which the video signal of the channel designated is inserted by means of the frame code and the channel designation code, and to perform the address control of the frame memory 26 in order that the video signal of the above frame is written in the frame memory 26 and in turn read-out repeatedly, and also to generate a switch command signal upon starting of the reading out from the frame memory 26. For instance, when two-channel video signals are combined as shown in FIG. 80, odd frame numbers may be assigned to the frame from the video signal of the channel A and even frame numbers may be assigned to the frames from the video signal of the channel B. Therefore, the frames of the channel A (or B) can be discriminated easily by using the frame number decoded from the frame code supplied from the frame code reading circuit 27.

The video signal read-out from the frame memory 26 is supplied to the other input terminal of the signal change-over switch 25. The signal change-over switch 25 is constructed to selectively output one of the video signal outputted from the video signal demodulator 23 and the video signal outputted from the frame memory 26. An output signal of this signal change-over switch 25 is supplied to a video output terminal 80. Therefore, if the video signal is recorded as shown in FIG. 3C, only the video signal of the channel A in the output signal of the video signal demodulator 28 is selectively outputted from the signal change-over switch 25 when the channel A is designated. During the period in which the video signal of the channel A is not present, the video signal read-out from the frame memory 26 is selectively outputted from the signal change over switch 25. Therefore, the video signal supplied to the video output terminal 30 becomes as shown in FIG. 3D. In this example, the above period in which the video signal of the channel A is not present is as long as one frame period since the video signals of the channels A and B are combined to alternate at every frame. However, this period will be prolonged if video signals of more than two channels are combined.

On the other hand, the audio signal in the block form is demodulated by the audio data demodulator 24 and in turn supplied to a buffer memory 31 and a block code read circuit 32. The block code read circuit 32 is, for example, constructed to successively read the block code inserted at the modulation stage, in the audio data in the block form, and to hold it until the next block code is read. The block code read by this block code is supplied to a block processing control circuit 33. The channel designation code outputted from the channel designation code generation circuit 29 is also supplied to the block processing control circuit 33. The block processing control circuit 33 is constructed to discriminate blocks in which the audio data of the designated channel is inserted by using the block code and the channel designation code, and to perform the address control of the buffer memory 31 in order that the audio data of the block is recorded in the buffer memory and in turn read-out from the buffer memory 31.

The audio data read-out from the buffer memory is supplied to a time base expanding circuit 34. The time base expanding circuit 34 is constructed, for example, to double, in the time base, the audio data. An output signal of this time base expanding circuit 34 is supplied to an audio output terminal 35.

If the audio data block is recorded as shown in FIG. 4E. only audio data blocks of the channel A are extracted and in turn doubled in the time axis when the channel A is designated. Therefore, the audio data block supplied to the audio output terminal 35 becomes as shown in FIG. 4F.

Figure 5:
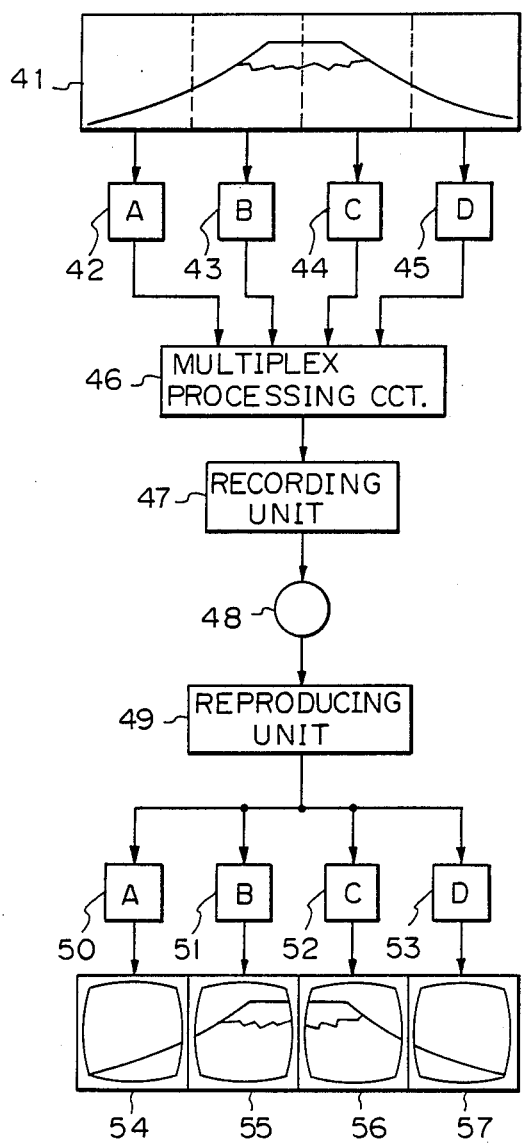
FIG. 5 is a block diagram showing a multi-picture system in which a recording and reproducing method according to the present invention is adopted.

FIG. 5 is a block diagram illustrating a so-called multi-picture system in which the information recording and reproducing method according to the present invention. In this figure, a picture 41 is divided into four parts, which are shot by video cameras 42 through 45 respectively. Video signals outputted from the video cameras 42 through 45 are supplied to a multiplex processing circuit 46 as video signals of channels A through D. The multiplex processing circuit 46 is constructed in the same manner as the circuit shown in FIG. 1 except that the number of channels is different.

An output signal of the multiplex processing circuit 46 is supplied to a recording unit 47 so as to be recorded on a single recording disk 48. Video signals read from this recording disk 48 by means of a reproducing unit 49 are supplied to demodulation circuits 50 through 58. Video signals outputted from this demodulation circuits 50 through 58 are supplied to each of display apparatuses 54 through 57, for example, so that the original picture is reproduced.

It will be appreciated from the foregoing, the information recording and reproducing method according to the present invention provides for interpolation of the thinned out portion of the video signals by recording the unit section of the video signal of the designated channel in the memory and repeatedly reading-out the signal stored in the memory until the next unit section of the video signal of the designated channel is read from the recording medium. Therefore, the reproduction time of the video signal is not shortened. On the other hand, the reproduction time of the audio signal is also maintained by the time base expanding of the time compressed audio signal. Thus, according to the present invention, video signals and audio signals of a plurality of channels can be recorded on a single recording medium and can be reproduced therefrom without shortening the recording time.

What is claimed is:

1. A method of recording a plurality of channels of video signals and a plurality of channels of audio signals associated with said video signals, on a recording medium, comprising the steps of:

periodically sampling each video signal at consecutive unit periods, thereby obtaining consecutive unit period samples of each video signal;

combining the sampled video signals by a time division multiplexing operation to form a single multiplex video signal comprising every other one of said unit period samples of each of said video signals;

digitizing each of said audio signals into a series of digital data, each series corresponding to a particular audio signal of said plurality of channels of audio signals;

dividing each of said series of digital data into a plurality of data blocks and effecting a time compression of the data blocks by a predetermined factor;

compressing in time each of the data blocks in each of said series of digital data;

combining said compressed data blocks of each of said series of digital data thereby forming a single digitized audio signal; and recording said multiplex video signal and said digitized audio signal at the same time on said recording medium.

2. A method as set forth in claim 1, wherein said unit period is equal to one frame of television signal.

3. A method of recording and reproducing a plurality of channels of video signals and a plurality of channels of audio signals to and from a recording medium, comprising the steps of:

periodically sampling each video signal at consecutive unit periods, thereby obtaining consecutive unit period samples of each video signal;

combining the sampled video signals by a time division multiplexing operation to form a single multiple video signal comprising every other one of said unit period samples of each of said video signals;

digitizing each of said audio signals into a series of digital data, each series corresponding to a particular audio signal of said plurality of channels of audio signals;

dividing each of said series of digital data into a plurality of data blocks and effecting a time compression of the data blocks by a predetermined factor;

compressing in time each of the data blocks in each of said series of digital data;

combining said compressed data blocks from each of said series of digital data thereby forming a single digitized audio signal;

recording said multiplex video signal and said digitized audio signal at the same time on said recording medium; and in reproduction, reading said multiplex video signal and digitized coded audio signal from said recording medium;

periodically sampling from said multiplex video signal read from said recording medium, the video signal corresponding to a particular one of said plurality of channels of video signals for one unit period and outputting the sampled video signal and storing said sampled video signal in a memory;

repeatedly reading-out said video signal stored in said memory until reading of said video signal corresponding to said particular one of said plurality of channels of video signals for the next unit period begins, thereby reproducing the video signal of said particular one of said plurality of channels of video signals;

periodically sampling from said digitized audio signal read from said recording medium the data block belonging to a particular one of said plurality of channels of audio signals; and expanding in time said sampled data block by a factor at least as large as said predetermined factor, thereby reproducing the audio signal of said particular one of said plurality of channels of audio signals.

4. A method as set forth in claim 3, wherein said unit period is equal to one frame of television signal.

5. An apparatus for recording a plurality of channels of video signals and a plurality of channels of audio signals associated with said video signals on a recording medium, said apparatus comprising:
- means for periodically sampling each video signal to obtain unit period samples of each video signal;
- time division multiplexing means for combining the sampled unit periods of said video signals to form a single multiplexed video signal comprising every other one of said unit period samples of each of said video signals;
- means for digitizing each of said audio signals of said plurality of channels into a series of digital data for each of said plurality of channels of audio signals;
- means for dividing each of said series of digital data into a plurality of data blocks and effecting time compression of the data blocks by a predetermined factor;
- means for time compressing each of said data blocks;
- time division multiplexing means for combining data blocks from each of said series of digital data to form a single digitized audio signal; and
- means for recording said multiplexed video signal and said digital audio signal at the same time on said recording medium.

6. An apparatus for recording and reproducing a plurality of channels of video signals and a plurality of channels of audio signals associated with said video signals to and from a recording medium, said apparatus comprising:
- means for periodically sampling each video signal to obtain unit samples of each video signal;
- time division multiplexing means for combining the sampled unit periods of said video signals to form a single multiplexed video signal comprising every other one of said unit period samples of each of said video signals;
- means for digitizing each of said audio signals of said plurality of channels into a series of digital data for each of said plurality of channels of audio signals;
- means for dividing each of said series of digital data into a plurality of data blocks and effecting time compression of the data blocks by a predetermined factor;
- means for time compressing each of said data blocks;
- time division multiplexing means for combining data blocks from each of said series of digital data to form a single digitized audio signal;
- means for recording said multiplexed video signal and said digital audio signal at the same time on said recording medium;
- means for reading said multiplex video signal and digitized coded audio signal from said recording medium;
- means for periodically sampling from said multiplex video signal read from said recording medium, the video signal corresponding to a particular one of said plurality of channels of video signals for one unit period and outputting the sampled video signal and storing said sampled video signal in a memory;
- means for repeatedly reading-out said video signal stored in said memory until reading of said video signal corresponding to said particular one of said plurality of channels of video signals for the next unit period begins, thereby reproducing the video signal of said particular one of said plurality of channels of video signals;
- means for periodically sampling from said digitized audio signal read from said recording medium the data block belonging to a particular one of said plurality of channels of audio signals; and
- means for expanding in time said sampled data block by a factor at least as large as said predetermined factor, thereby reproducing the audio signal of said particular one of said plurality of channels of audio signals.

* * * * *